(12) United States Patent
Gong et al.

(10) Patent No.: US 9,398,211 B2
(45) Date of Patent: Jul. 19, 2016

(54) MULTI-DEVICE ALIGNMENT FOR COLLABORATIVE MEDIA CAPTURE

(71) Applicant: Intel Corporation, Santa Clara, CA (US)

(72) Inventors: Michelle X. Gong, Sunnyvale, CA (US); Horst W. Haussecker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 13/715,637

(22) Filed: Dec. 14, 2012

(65) Prior Publication Data

US 2014/0168358 A1    Jun. 19, 2014

(51) Int. Cl.
*H04N 5/232* (2006.01)

(52) U.S. Cl.
CPC ....... *H04N 5/23222* (2013.01); *H04N 5/23206* (2013.01); *H04N 5/23238* (2013.01); *H04N 5/23293* (2013.01)

(58) Field of Classification Search
CPC .......... H04N 5/23238; H04N 5/23293; H04N 5/23206; H04N 5/23222
USPC ................................. 348/36, 38, 39
See application file for complete search history.

(56) References Cited

U.S. PATENT DOCUMENTS

| | | | | |
|---|---|---|---|---|
| 6,075,905 A * | 6/2000 | Herman | ................... | G06K 9/32 348/588 |
| 6,510,283 B1 * | 1/2003 | Yamagishi | ............. | G03B 17/00 348/208.99 |
| 7,324,135 B2 * | 1/2008 | Ouchi et al. | ................ | 348/218.1 |
| 7,424,218 B2 * | 9/2008 | Baudisch | ................ | G03B 13/02 348/218.1 |
| 7,450,839 B2 * | 11/2008 | Lee | ......................... | H04N 5/232 348/208.1 |
| 7,796,871 B2 * | 9/2010 | Park | ....................... | G03B 37/02 396/322 |
| 7,936,374 B2 * | 5/2011 | Cutler | ...................... | 348/211.11 |
| 9,007,428 B2 * | 4/2015 | Zhou | ............................... | 348/36 |
| 9,131,152 B2 * | 9/2015 | Arai | ................... | H04N 5/23238 |
| 2002/0071677 A1 * | 6/2002 | Sumanaweera | ............... | 396/429 |
| 2006/0285150 A1 * | 12/2006 | Jung et al. | ..................... | 358/1.15 |
| 2009/0058990 A1 * | 3/2009 | Kim | ....................... | G03B 37/04 348/36 |
| 2011/0090337 A1 * | 4/2011 | Klomp et al. | ................. | 348/144 |

(Continued)

FOREIGN PATENT DOCUMENTS

WO    WO 2012/131151    *    4/2012

OTHER PUBLICATIONS

El-Saban et al, "Active Feedback for Enhancing the Construction of Panoramic Live Mobile Video Streams", Multimedia and Expo (ICME), 2011 IEEE International Conference, Jul. 2011, pp. 1-6.*

(Continued)

*Primary Examiner* — David Harvey
(74) *Attorney, Agent, or Firm* — Jordan IP Law, LLC (57) ABSTRACT

Systems and methods of conducting collaborative image capture may provide for transferring sensor data from a plurality of image capture devices to a designated master device, which may in turn determine rough alignment recommendations for the image capture devices. The image capture devices may receive the alignment recommendations and output them to a preview display for manual alignment and/or to an automated adjustment system for automated alignment. Additionally, the image capture devices may transfer preview image data to the master device, wherein fine alignment recommendations may be made based on the preview image data.

30 Claims, 7 Drawing Sheets

(56) References Cited

U.S. PATENT DOCUMENTS

| | | | |
|---|---|---|---|
| 2011/0312374 A1* | 12/2011 | Chen et al. | 455/556.1 |
| 2012/0077522 A1* | 3/2012 | Mate et al. | 455/456.3 |
| 2013/0127984 A1* | 5/2013 | Grecu | 348/36 |
| 2013/0141524 A1* | 6/2013 | Karunamuni | G06T 3/4038 348/38 |
| 2013/0275505 A1* | 10/2013 | Gauglitz et al. | 709/204 |
| 2014/0247325 A1* | 9/2014 | Wu et al. | 348/39 |

OTHER PUBLICATIONS

El-Saban et al, "Stitching Videos Streamed by Mobile Phones in Real-time", MM'09, Oct. 2009, pp. 1009-1010.*

* cited by examiner

MULTI-DEVICE ALIGNMENT FOR COLLABORATIVE MEDIA CAPTURE

CROSS-REFERENCE TO RELATED APPLICATIONS

The present application is related to U.S. patent application Ser. No. 13/077,372, filed Mar. 31, 2011 and U.S. patent application Ser. No. 12/888,832, filed Sep. 23, 2010.

BACKGROUND

1. Technical Field

Embodiments generally relate to capturing images. More particularly, embodiments relate to the use of multiple devices to capture collaborative images.

2. Discussion

Conventional approaches to capturing panoramic scenes may involve the use of a single image capture device and a "stitching" software application to combine multiple images captured of the scene by the device at different moments in time. Such an approach may result in perspective distortions and undesired artifacts, particularly with regard to individual images of the edges of a relatively wide panoramic scene. Moreover, if there is a moving object in the scene, the object may appear in multiple locations after the captured images are stitched together.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
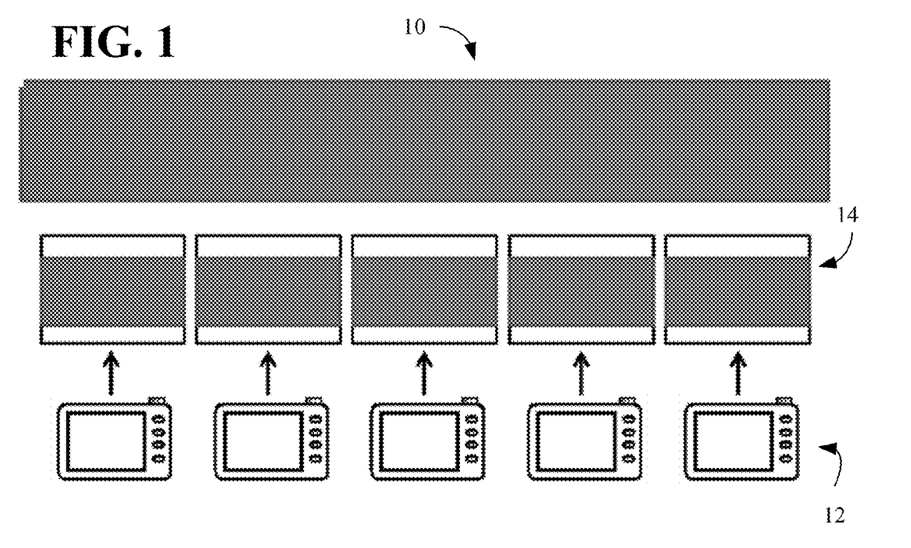
FIG. 1 is a block diagram of an example of a collaborative image capture event with respect to a panoramic scene according to an embodiment.
Figure 2:
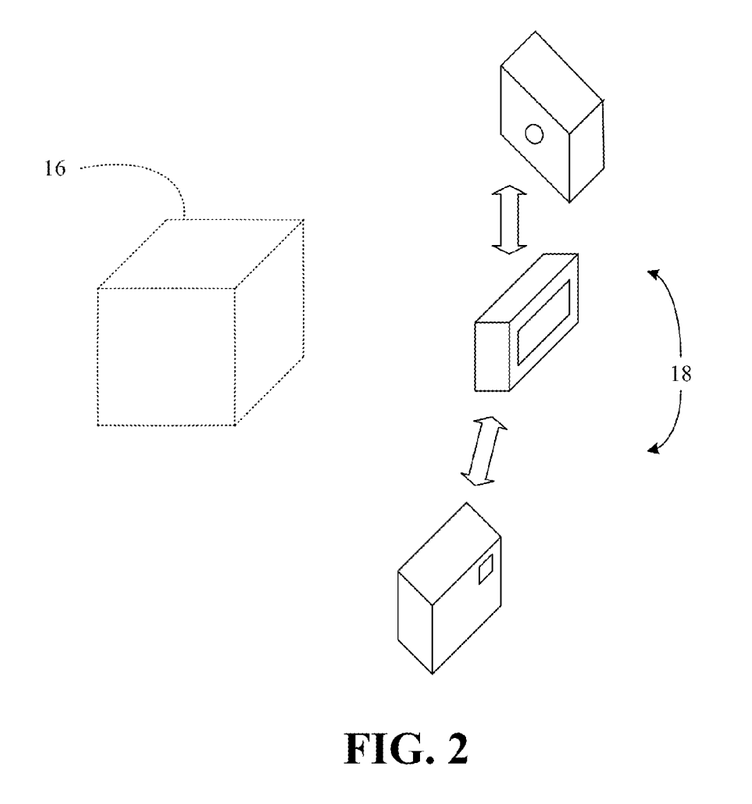
FIG. 2 is a block diagram of a collaborative image capture event with respect to a three dimensional (3D) scene according to an embodiment.

Turning now to FIG. 1, a panoramic scene 10 is shown, wherein the scene 10 may include, for example, a relatively wide landscape, skyline, and so forth. In the illustrated example, a plurality of image capture devices 12 are used to capture a corresponding plurality of images 14, wherein the images 14 may be used to reconstruct the panoramic scene 10. Of particular note is that the illustrated images 14 are aligned with respect to the scene 10 even though each image capture device 12 may be positioned/held by a different person and/or platform. As will be discussed in greater detail, an ad hoc network between the image capture devices 12 may be used to transfer adjustment recommendations between the devices 12 so that the illustrated alignment may be achieved. Similarly, FIG. 2 shows a three dimensional (3D) scene 16 in which adjustment recommendations may be shared between a plurality of image capture devices 18 in order to facilitate alignment of images captured by the devices 18 and accurate reconstruction of the 3D scene 16. Thus, the illustrated approaches enable collaborative image capture in both a panoramic context and a 3D context.

Figure 3:
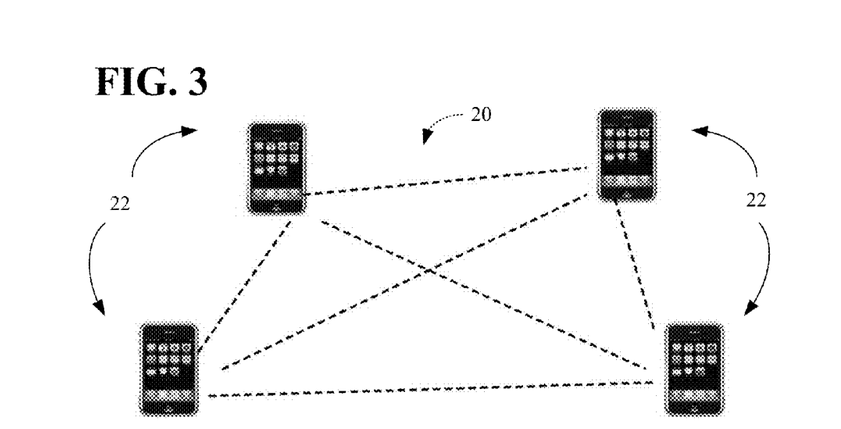
FIG. 3 is a block diagram of an example of an ad hoc network between a plurality of image capture devices according to an embodiment.

FIG. 3 shows an ad hoc network 20 that may be established between a plurality of image capture devices 22 in conjunction with a collaborative image capture event. The illustrated ad hoc network 20 may be implemented via, for example, Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), Bluetooth (e.g., Institute of Electrical and Electronics Engineers/IEEE 802.15.1-2005, Wireless Personal Area Networks), or other suitable wireless and/or wired communication protocol. The illustrated devices 22, which form peer-to-peer (P2P) communication links with one another, may be readily substituted for the devices 12 (FIG. 1) and/or the devices 18 (FIG. 2), already discussed. For example, the devices 22 may include smart tablets, personal digital assistants (PDAs), mobile Internet devices (MIDs), smart phones, media players, etc., or any combination thereof. The devices 22 may exchange information through an out of band secure channel that limits participation to only users with trusted credentials.

The devices 22 may also communicate with a remote computing platform (not shown) such as, for example, a cloud server, in order to facilitate image analysis, the generation and/or transfer of adjustment recommendations, as well as the generation of collaborative images based on the images captured by the devices 22, as will be discussed in greater detail. The use of a cloud server may provide additional processing resources (e.g., high performance central processing unit/CPU and/or graphics processing unit/GPU) that may be particularly useful for image processing tasks. During the setup of the ad hoc network 20, the devices 22 may identify one of the devices 22 as a "master" device, as well as calibrate their sensors together, as will also be discussed in greater detail. The remote computing platform (e.g., cloud server) may also function as the master device.

Figure 4:
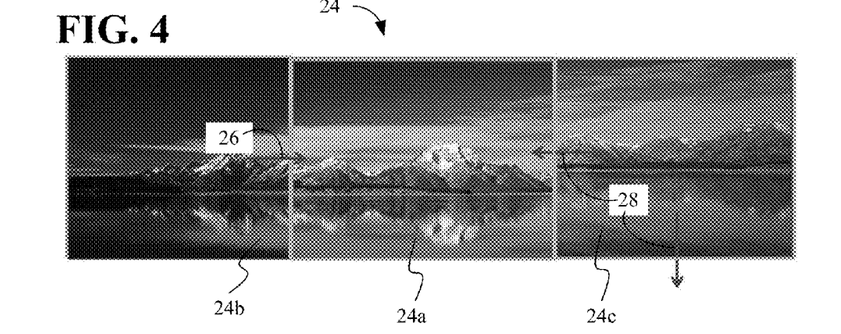
FIG. 4 is an illustration of an example of a set of real-time adjustment recommendations based on sensor fusion data according to an embodiment.

Turning now to FIG. 4, a panoramic scene 24 (24a-24c) is shown in which three image capture devices are each used to capture a portion of the scene 24. In the illustrated example, a first image capture device (not shown) has an image preview (e.g., viewfinder) window that is originally set to capture a first portion 24a of the scene 24 (e.g., due to the positioning of the device by its corresponding user and/or platform), a second image capture device (not shown) has an image preview window that is originally set to capture a second portion 24b of the scene 24, and a third image capture device (not shown) has an image preview window that is originally set to capture a third portion 24c of the scene 24. Thus, the illustrated example might correspond to the time period after the devices have joined the ad hoc network and during which the users of the devices have aimed/pointed the devices at the scene 24. In general, because the second portion 24b and the third portion 24c are not correctly aligned (e.g., horizontally and vertically) with the first portion 24a, adjustment recommendations may be transmitted to the second and third image capture devices.

Figure 5:
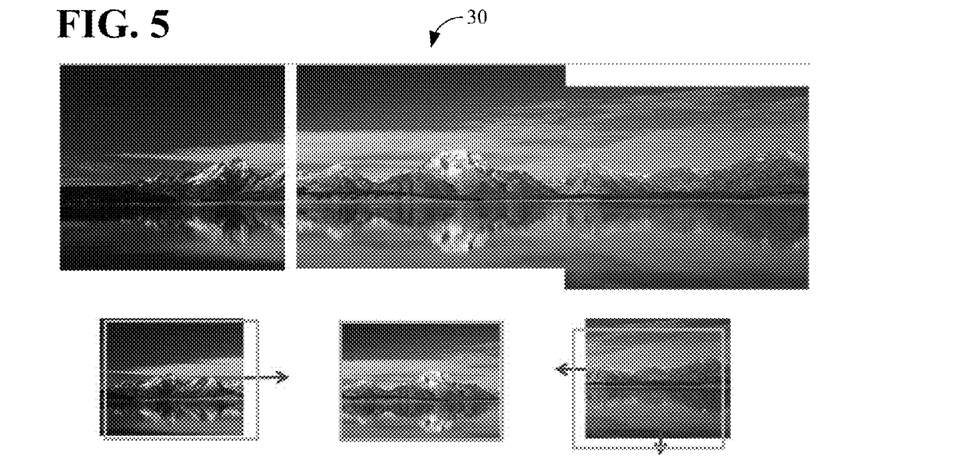
FIG. 5 is an illustration of an example of a collaborative preview window according to an embodiment.

In the illustrated example, an adjustment recommendation 26 is sent to the second image capture device in the form of a graphical arrow pointing to the right to instruct the user of the second image capture device to move/shift the second image capture device so that the preview image moves to the right (e.g., into the rectangle). Additionally, an adjustment recommendation 28 may be sent to the third image capture device in the form of a graphical arrow pointing to the left and a graphical arrow pointing downward to instruct the user of the third image capture device to move/shift the third image capture device so that the preview image moves to the left and down (e.g., into the rectangle). Other operations/movements such as exposure setting (e.g., to create uniform contrast, color temperature, etc., across the entire collaborative image), zoom, rotate (e.g., yaw, pitch) and/or twist (e.g., roll) operations may also be reflected in the adjustment recommendations 26, 28. Moreover, the adjustment recommendations 26, 28 may also be output to an automated adjustment system associated with the second and/or third image capture devices, wherein the automated adjustment system may perform the recommended adjustments without user intervention. FIG. 5 shows a collaborative preview window 30 in which the scene is shown along with the individual image preview windows and corresponding adjustment recommendations. The collaborative preview window 30 may be displayed via, for example, a display of a master device, as will be discussed in greater detail.

Figure 6A:
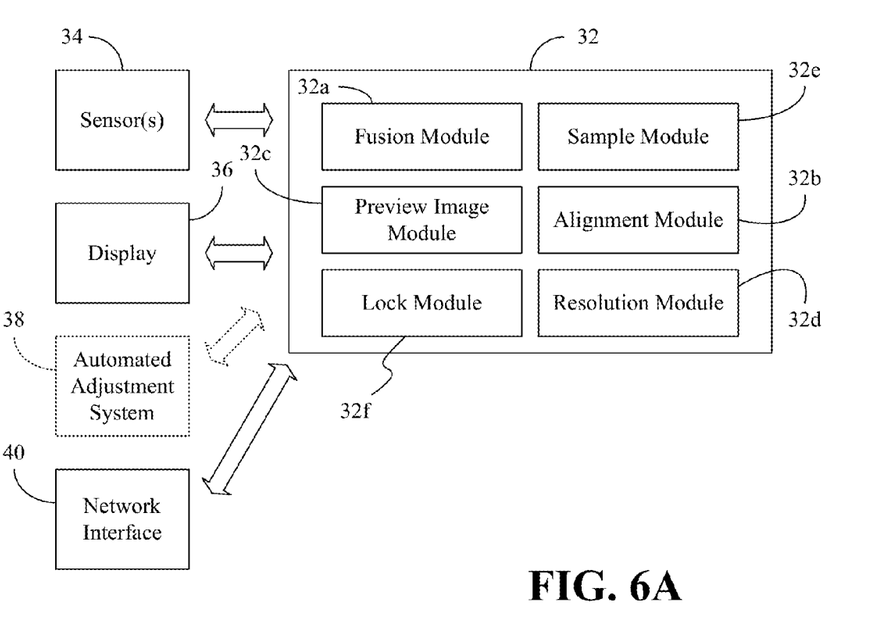
FIG. 6A is a block diagram of an example of a slave device logic architecture according to an embodiment.

FIG. 6A shows a slave device logic architecture 32 (32a-32f), wherein the slave device logic architecture 32 may be generally used to enable a local image capture device (e.g., functioning as a slave device) containing the logic architecture 32 to participate in collaborative image capture events. In the illustrated example, the image capture device includes sensors 34 such as a GPS (global positioning system) sensor, barometer, accelerometer, gyroscope, compass, Wi-Fi radio/sensor, Bluetooth radio/sensor, infrared (IR) sensor, UWB (ultra wideband) sensor, RF (radio frequency, e.g., 60 GHz) sensor, etc., or any combination thereof, wherein the sensors 34 may provide data relating to the location and/or orientation of the image capture device. For example, the sensors 34 may be used to measure latitude, longitude and altitude, as well as orientation parameters such as yaw, pitch and roll (e.g., $\alpha$, $\beta$, $\gamma$, based on compass, accelerometer and/or gyroscope measurements) of the local image capture device.

A fusion module 32a may use a network interface 40 (e.g., Wi-Fi radio, Bluetooth radio, cellular radio, etc.) to transmit the location and orientation data to a master device, which may be another image capture device in the ad hoc network or a remote computing platform such as a cloud server, for further processing. The fusion module 32a may therefore "fuse" together information (e.g., meta data) from a wide variety of sensors. An alignment module 32b may receive alignment recommendations via the network interface 40 for collaborative image capture events and output the alignment recommendations to a preview display 36 and/or automated adjustment system 38 of the local image capture device. The use of the sensor data may therefore be considered a rough device alignment procedure that enables the image capture devices participating in collaborative image capture events to be oriented in the general direction of the subject of the image capture while maintaining relatively low processing overhead (e.g., without image processing).

The illustrated slave device logic architecture 32 also includes a preview image module 32c that captures preview image data (e.g., real-time video) from the scene and uses the network interface 40 to transmit the preview image data to the master device, wherein the preview image module 32c may use imaging hardware (e.g., charge coupled devices/CCDs, graphics pipeline components, etc.) and/or software to capture the preview image data. The master device may further generate adjustment recommendations based on the preview image data. The use of the preview image data to obtain adjustment recommendations may therefore be considered a fine-grained device alignment based on real-time image processing. Moreover, the preview image data may be captured at a relatively low resolution on a continuous and/or periodic basis, wherein the resolution may be set by the master device based on, for example, the preview capability of the master device. Thus, the illustrated architecture 32 also includes a resolution module 32d that receives resolution information from the master device and applies the resolution to a resolution setting of the local image capture device.

The slave device logic architecture 32 may also include a sample module 32e configured to receive sample requests from the master device, and conduct zoom out operations in response to the sample requests. In this regard, it may be advantageous for the master device to use a sample of the scene in question in order to conduct a more detailed image alignment analysis based on the preview image data received from the devices participating in the collaborative image capture event. In one example, a sample collaborative image may be obtained from one of the participating devices. Accordingly, the illustrated sample module 32e captures the sample collaborative image and transmits the sample collaborative image to the master device via the network interface 40. The sample collaborative image may also be obtained from another source such as an online source (e.g., image database), as will be discussed in greater detail.

Once the master device has determined that one or more of the image capture devices are aligned, it may transmit/broadcast a lock message to the aligned image capture devices. Thus, the illustrated architecture 32 also includes a lock module 32f to receive the lock message from the master device, and prepare to participate in the collaborative image capture event in response to the lock message, wherein the lock message is associated with a successful alignment condition with respect to the local image capture device. The lock message may also cause the preview window of the local image capture device to change in appearance (e.g., red rectangle around preview image disappears). In other examples, the device may beep, vibrate, stop beeping, stop vibrating, and so forth, to indicate that the device is properly aligned. Participation in the collaborative image capture event may involve capturing a relatively high resolution image of the scene in question.

Figure 6B:
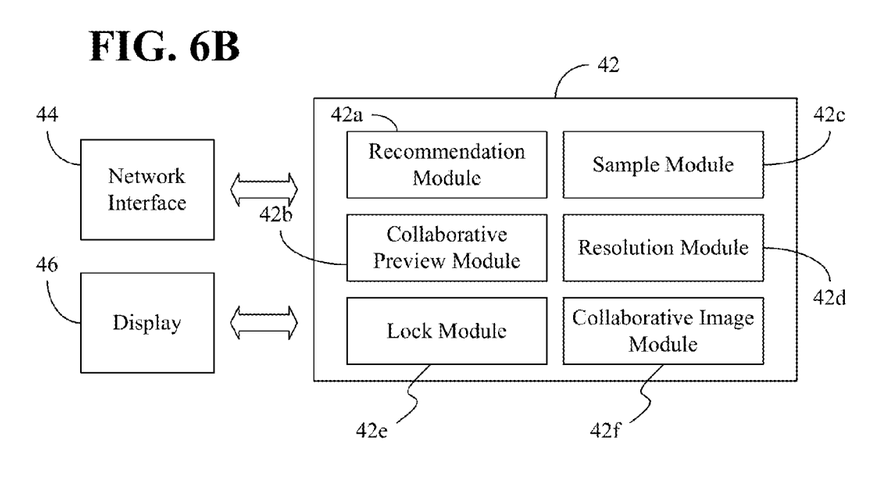
FIG. 6B is a block diagram of an example of a master device logic architecture according to an embodiment.

Turning now to FIG. 6B, a master device logic architecture 42 (42a-42f) is shown in which the master device logic architecture 42 may be generally used to enable a local image capture device (e.g., functioning as a master device) containing the logic architecture 42 to manage collaborative image capture events. The logic architecture 42 may also be used by a remote computing platform such as a cloud server to manage collaborative image capture events. In the illustrated example, a recommendation module 42a receives sensor data from a plurality of image capture devices via a network interface 44 (e.g., Wi-Fi radio, Bluetooth radio, cellular radio, etc.), wherein the sensor data includes location data and/or orientation data, as already discussed. The recommendation module 42a may determine rough adjustment recommendations for collaborative image capture events based on the sensor data, and transmit the rough adjustment recommendations to the appropriate image capture devices.

The recommendation module 42a may also receive preview image data from the image capture devices via the network interface 44, conduct an image alignment analysis (e.g., pixel level analysis), and determine fine adjustment recommendations based on the image alignment analysis. The adjustment recommendations may include graphical representations of shift operations, rotate operations, twist operations, and so forth. The illustrated architecture 42 also includes a collaborative preview module 42b that generates collaborative previews based at least in part on the preview image data and the alignment recommendations, and outputs the collaborative previews via a local display 46 (e.g., viewfinder window/display) of the master device. One example of a collaborative preview is the collaborative preview window 30 (FIG. 5), already discussed.

The master device logic architecture 42 may also include a sample module 42c that obtains a sample collaborative image from an online source, one or more of the image capture devices, etc., wherein the recommendation module 42a uses the sample collaborative image to conduct the image alignment analysis and/or exposure calibration/adjustment. The illustrated architecture 42 also includes a resolution module 42d to determine resolution information based at least in part on the preview capability of the master device, and transmit the resolution information to one or more of the image capture devices. For example, the resolution module 42d may ensure that all of the preview image data fits within the preview window of the master device. A lock module 42e may detect successful alignment conditions with respect to the participating image capture devices, and transmit lock messages to the aligned devices in response to the successful alignment conditions. The illustrated architecture 42 also includes a collaborative image module 42f to receive captured images from each of the participating image capture devices, and generate a collaborative image based at least in part on the captured images. The collaborative image may include a panoramic image, a 3D image, and so forth.

A lightweight networking protocol may be used to transfer the sensor data, resolution information and adjustment recommendations. In particular, a frame format may be defined that enables easy parsing and real-time processing of data. One example of such a frame format is shown in Table I.

TABLE I

| Frame Type | Frame Length | Frame Body |
| --- | --- | --- |

The frame type field may define the type of frame being transmitted: 1) sensor data, 2) resolution information, or 3) adjustment recommendation. The frame length field may indicate the length of the frame body field, wherein the frame body field may contain the payload of the transmission. In one example, the frame type field is one octet long, the frame length field is two octets long, and size of the frame body field varies depending upon the type of frame. For sensor data, for example, the frame body field may include the calculated location (e.g., X, Y, Z coordinates) and orientation (e.g., α, β, γ) of the device, and optionally additional numeric information for estimated error. For resolution information, the frame body field may include a few defined variable-length sub-elements such as, for example, frame height, frame width, video frame rate, video frame bit rate, and so forth. For adjustment recommendations, the frame body field might be a one octet field as shown in Table II.

TABLE II

| Frame Body | Meaning |
| --- | --- |
| 0 | Move_Left |
| 1 | Move_Right |
| 2 | Move_Up |
| 3 | Move_Down |
| 4 | Move_Forward |
| 5 | Move_Back |
| 6 | Rotate_Left |
| 7 | Rotate_Right |
| 8 | Rotate_Up |
| 9 | Rotate_Down |
| 10 | Twist_Left |
| 11 | Twist_Right |

The frame body field may also be configured to accommodate additional recommendations such as exposure setting operations and/or zoom operations, as already noted.

Figure 7:
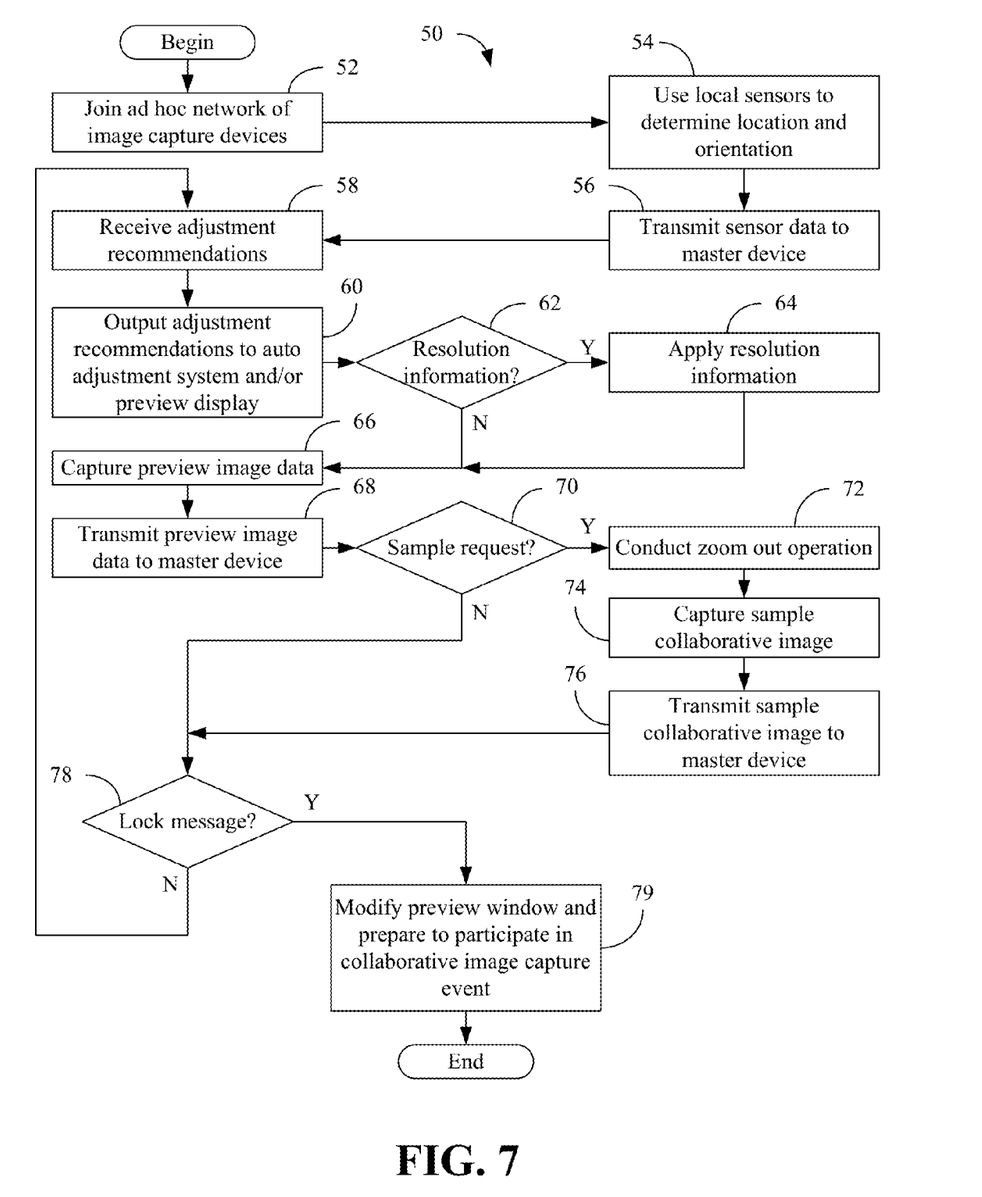
FIG. 7 is a flowchart of an example of a method of operating a slave device according to an embodiment.

FIG. 7 shows a method 50 of operating a local image capture device (e.g., functioning as a slave device) in conjunction with a collaborative image capture event. The method 50 might be implemented in a local image capture device such as, for example, the devices 12 (FIG. 1), devices 18 (FIG. 2) and/or devices 22 (FIG. 3) as a set of logic/module instructions stored in a machine- or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 50 may be written in any combination of one or more programming languages, including an object oriented programming language such as Java, Smalltalk, C++ or the like and conventional procedural programming languages, such as the "C" programming language or similar programming languages.

Illustrated processing block 52 provides for joining an ad hoc network of image capture devices, wherein one or more local sensors may be used at block 54 to determine a location and orientation of the local image capture device. Block 56 may transmit the sensor data to a master device. Illustrated block 58 receives one or more adjustment recommendations from the master device, wherein the adjustment recommendations may be output to a preview display and/or automatic adjustment system at block 60. A determination may be made at block 62 as to whether resolution information has also been received from the master device. If so, illustrated block 64 applies the resolution information to a resolution setting of the local image capture device.

Preview image data may be captured at block 66, wherein illustrated block 68 provides for transmitting the preview image data to the master device. Block 70 may determine whether a sample request has been received from the master device. If so, illustrated block 72 conducts a zoom out operation, wherein a sample collaborative image may be captured at block 74 and transmitted to the master device at block 76. A determination may be made at block 78 as to whether a lock message has been received from the master device. If so, block 79 may provide for modifying the local preview window and preparing to participate in a collaborative image capture event. Otherwise, the image-based adjustment process may be repeated.

Figure 8:
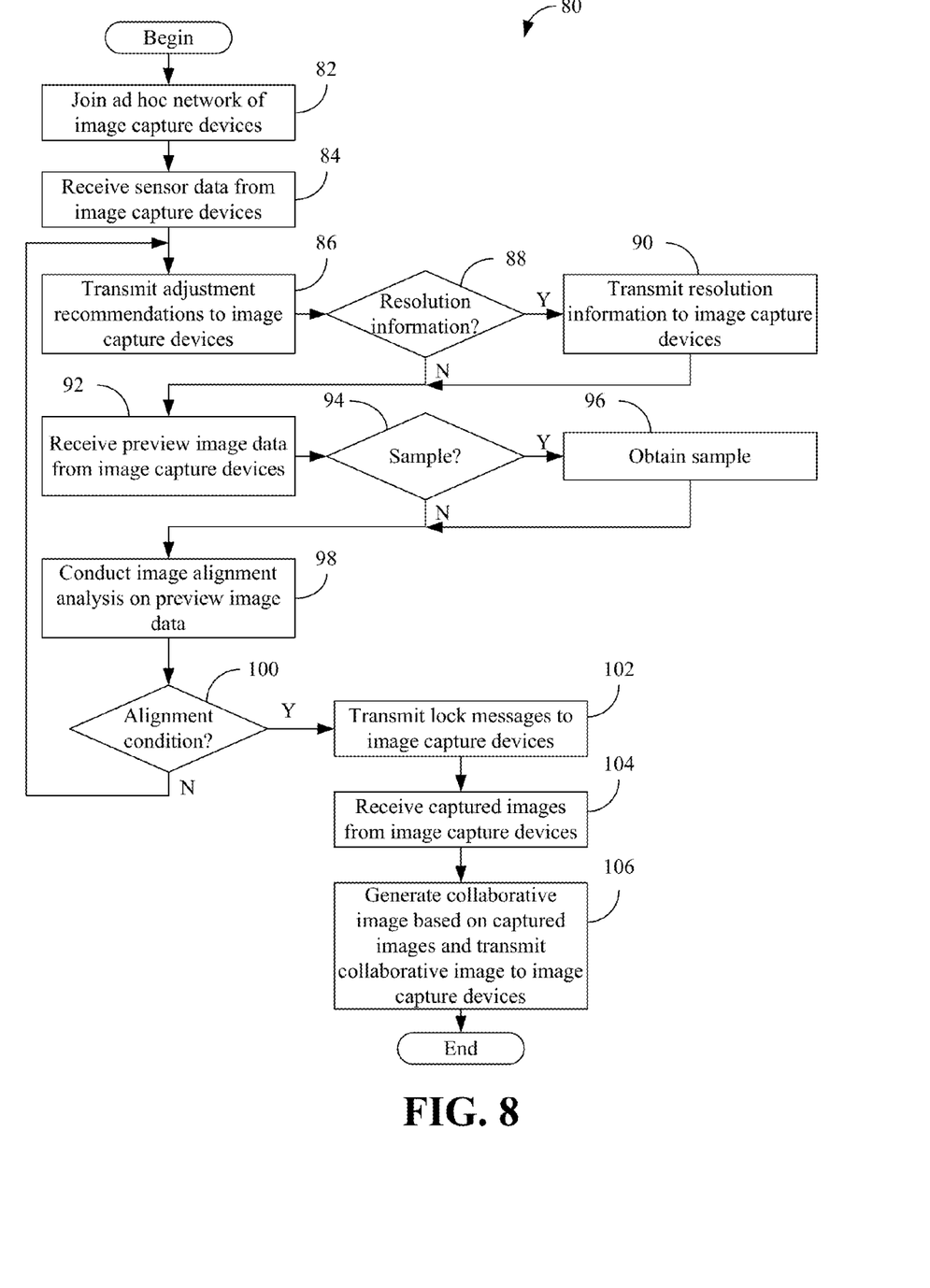
FIG. 8 is a flowchart of an example of a method of operating a master device according to an embodiment.

FIG. 8 shows a method 80 of operating a master device in conjunction with a collaborative image capture event. The method 80 might be implemented in a cloud server or a local image capture device such as, for example, the devices 12 (FIG. 1), devices 18 (FIG. 2) and/or devices 22 (FIG. 3) as a set of logic/module instructions stored in a machine- or computer-readable medium of a memory such as RAM, ROM, PROM, firmware, flash memory, etc., in configurable logic such as, for example, PLAs, FPGAs, CPLDs, in fixed-functionality logic hardware using circuit technology such as ASIC, CMOS or TTL technology, or any combination thereof. For example, computer program code to carry out operations shown in method 80 may be written in any combination of one or more programming languages, including an object oriented programming language such as Java, Smalltalk, C++ or the like and conventional procedural programming languages, such as the "C" programming language or similar programming languages.

Illustrated processing block 82 provides for joining an ad hoc network of image capture devices, wherein sensor data may be received at block 84 from the image capture devices. Block 86 may determine adjustment recommendations based on the sensor data and transmit the adjustment recommendations to the image capture devices. A determination may be made at block 88 as to whether resolution information is to be used. If so, the resolution information may be determined based on the preview capability of the master device and transmitted to one or more of the image capture devices at block 90. Preview image data may also be received at block 92 from the image capture devices, wherein illustrated block 94 determines whether a sample collaborative image is to be used. If so, block 96 may provide for obtaining the sample collaborative image from one of the image capture devices, an online source, etc.

An image alignment analysis may be conducted on the preview image data at block 98, wherein the adjustment recommendations may be determined further based on the image alignment analysis. If a successful alignment condition is detected at block 100 with respect to the image capture devices, illustrated block 102 provides for transmitting lock messages to the image capture devices. If a successful alignment condition is not detected, on the other hand, the illustrated process may repeat by returning to block 86 and transmitting adjustment recommendations to the image capture devices again. In one example, the alignment condition determination at block 100 may be made both on a device-by-device basis and an entire ad hoc network basis so that the lock messages inform each image capture device when that particular device is aligned as well as when all devices are aligned. Block 104 may receive a captured image from each of the image capture devices to obtain a corresponding plurality of captured images, wherein illustrated block 106 generates a collaborative image based at least in part on the plurality of captured images. The collaborative image may include a panoramic image, a 3D image, and so forth. Block 106 may also provide for transmitting the collaborative image to the image capture devices in the ad hoc network.

Figure 9:
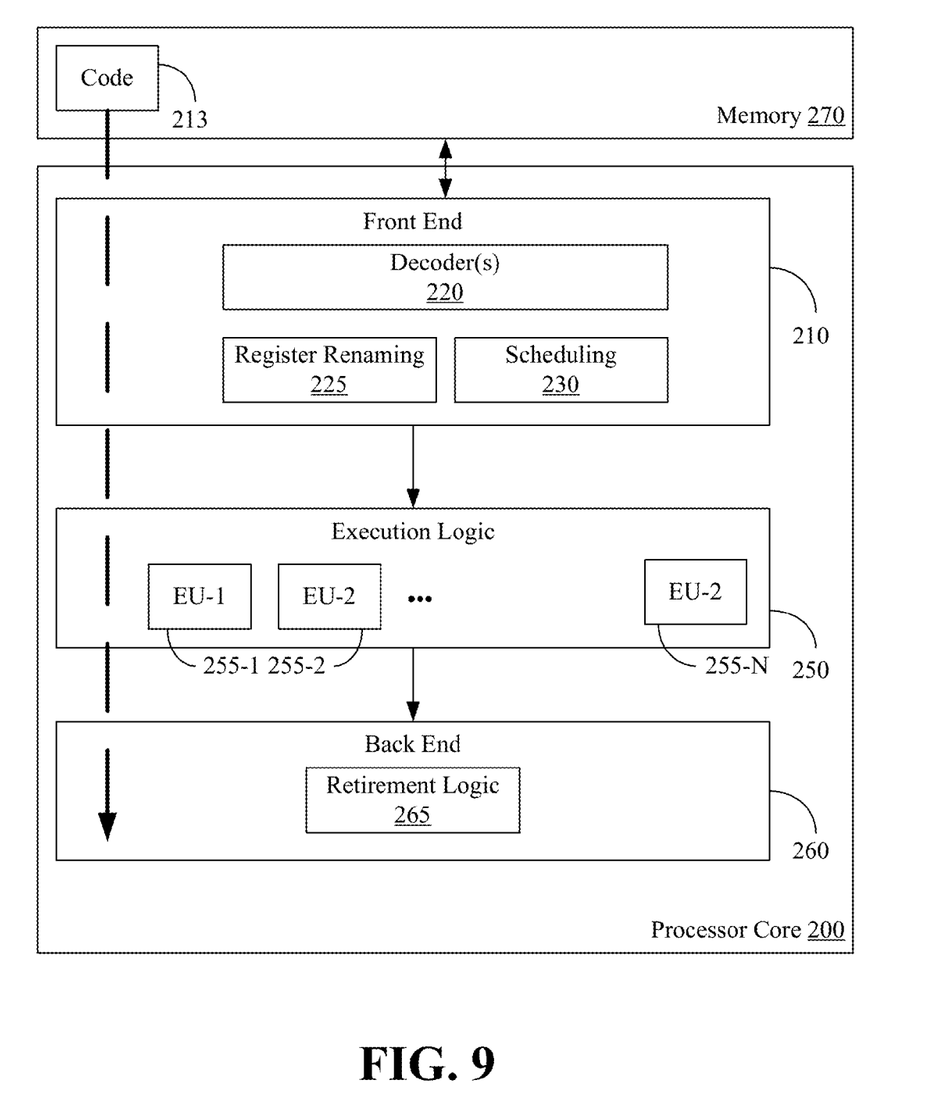
FIG. 9 is a block diagram of an example of a processor core according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the slave device logic architecture 32 (FIG. 6A) and/or the master device logic architecture 42 (FIG. 6B), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include IO (input output) control logic and/or may include IO control logic integrated with memory control logic. The processing element may also include one or more caches.

Figure 10:
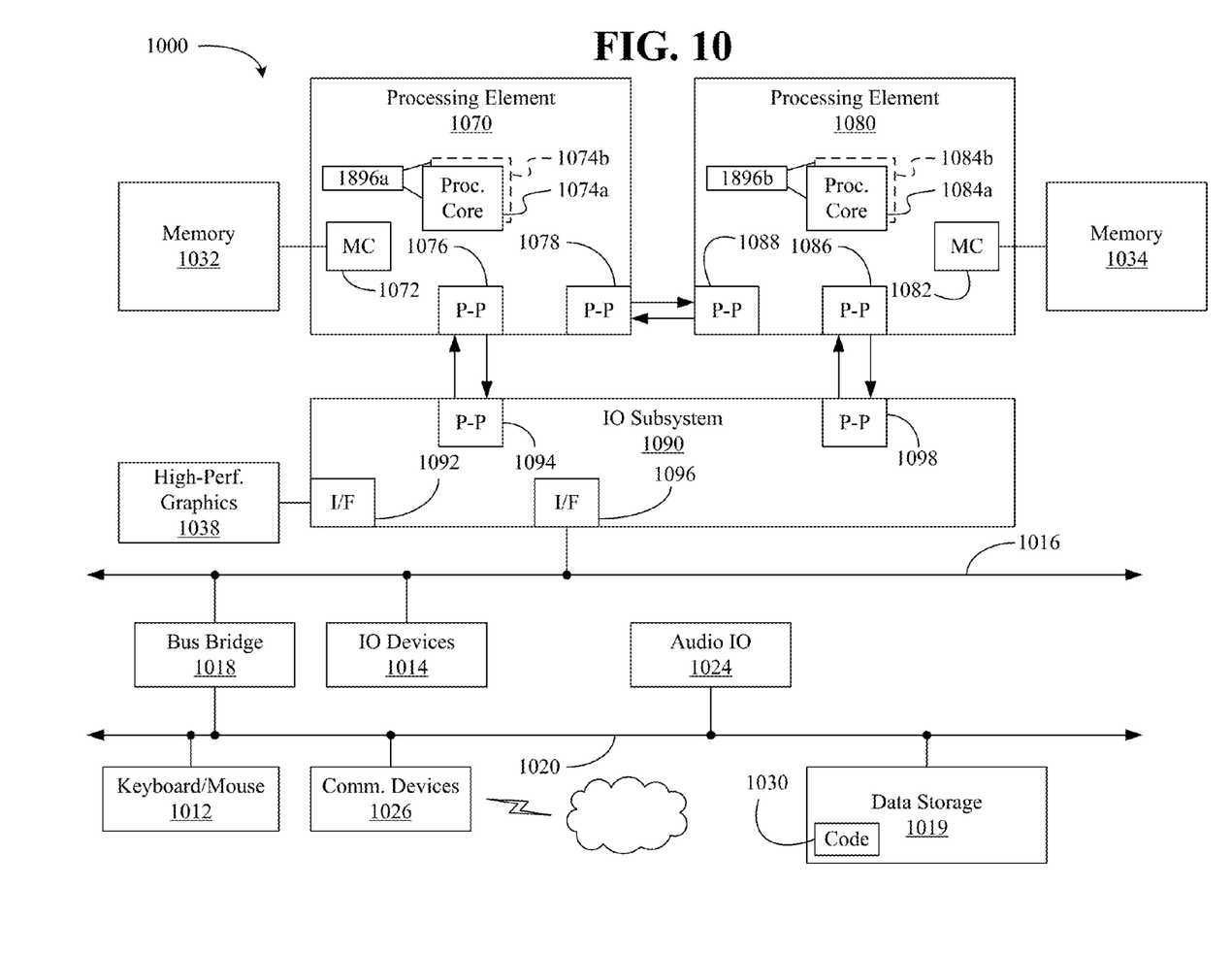
FIG. 10 is a block diagram of an example of a system according to an embodiment.

Referring now to FIG. 10, shown is a block diagram of a system 1000 embodiment. Shown in FIG. 10 is a multiprocessor system 1000 that includes a first processing element 1070 and a second processing element 1080. While two processing elements 1070 and 1080 are shown, it is to be understood that an embodiment of system 1000 may also include only one such processing element.

The system 1000 is illustrated as a point-to-point interconnect system, wherein the first processing element 1070 and second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 9.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an IO subsystem 1090 via P-P interconnects 1076, 1086 and 1084, respectively. In one example, the IO subsystem 1090 may be used to implement the secure element 22 (FIG. 2A) and/or the secure element 36 (FIG. 2B) as a secure execution environment having integrated wireless information input, as already discussed. As shown in FIG. 10, the IO subsystem 1090 includes P-P interfaces 1094 and 1098. Furthermore, IO subsystem 1090 includes an interface 1092 to couple IO subsystem 1090 with a high performance graphics engine 1038. In one embodiment, bus 1049 may be used to couple graphics engine 1038 to IO subsystem 1090. Alternately, a point-to-point interconnect 1039 may couple these components.

In turn, IO subsystem 1090 may be coupled to a first bus 1016 via an interface 1096. In one embodiment, the first bus 1016 may be a Peripheral Component Interconnect (PCI) bus, or a bus such as a PCI Express bus or another third generation IO interconnect bus, although the scope of the present invention is not so limited.

As shown in FIG. 10, various IO devices 1014 (e.g., image capture components) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the slave device logic architecture 32 (FIG. 6A) and/or the master device logic architecture 42 (FIG. 6B), and may be similar to the code 213 (FIG. 9), already discussed. Further, an audio IO 1024 may be coupled to second bus 1020.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Examples may therefore include a method of operating a master device involving receiving sensor data from a plurality of image capture devices, wherein the sensor data includes one or more of location data and orientation data. The method may also provide for determining one or more adjustment recommendations for a collaborative image capture event based at least in part on the sensor data, and transmitting the one or more adjustment recommendations to one or more of the plurality of image capture devices.

Additionally, the method of operating a master device may further include receiving preview image data from the plurality of image capture devices, and conducting an image alignment analysis on the preview image data, wherein the one or more adjustment recommendations are determined further based on the image alignment analysis.

Additionally, the method of operating a master device may further include generating a collaborative preview based at least in part on the image data and the one or more adjustment recommendations, and outputting the collaborative preview via a local display of the master device.

Moreover, the method of operating a master device may further include obtaining a sample collaborative image from one or more of an online source and one of the plurality of image capture devices, wherein the sample collaborative image is used to conduct the image alignment analysis.

In addition, the method of operating a master device may further include determining resolution information based at least in part on a preview capability of the master device, and transmitting the resolution information to one or more of the plurality of image capture devices.

In addition, the method of operating a master device may further include detecting a successful alignment condition with respect to one or more of the plurality of image capture devices, and transmitting a lock message in response to the successful alignment condition.

Moreover, the method of operating a master device may further include receiving a captured image from each of the plurality of image capture devices to obtain a corresponding plurality of captured images, generating a collaborative image based at least in part on the plurality of captured images, wherein the collaborative image includes one or more of a panoramic image and a three dimensional (3D) image, and transmitting the collaborative image to the plurality of image capture devices.

Additionally, the one or more adjustment recommendations in any of the aforementioned method examples of operating a master device may include a graphical representation of one or more of an exposure setting operation, a zoom operation, a shift operation, a rotate operation and a twist operation.

Examples may also include at least one computer readable storage medium having a set of instructions which, when executed by a processor, cause a master device to perform any of the aforementioned method examples of operating a master device.

Examples may also include a master device having means for performing any of the aforementioned method examples of operating a master device.

Examples may also include a master device having a recommendation module to receive sensor data from a plurality of image capture devices, wherein the sensor data is to include one or more of location data and orientation data. The recommendation module may also determine one or more adjustment recommendations for a collaborative image capture even based at least in part on the sensor data, and transmit the one or more adjustment recommendations to one or more of the plurality of image capture devices.

Additionally, the recommendation module may receive preview image data from the plurality of image capture devices and conduct an image alignment analysis on the preview image data, wherein the one or more adjustment recommendations are to be determined further based on the image alignment analysis.

Additionally, the master device may further include a collaborative preview module to generate a collaborative preview based at least in part on the preview image data and the one or more adjustment recommendations, and output the collaborative preview via a local display of the master device.

Moreover, the master device may further include a sample module to obtain a sample collaborative image from one or more of an online source and one or more of the plurality of image capture devices, wherein the sample collaborative image is to be used to conduct the image alignment analysis.

In addition, the master device may further include a resolution module to determine resolution information based at least in part on a preview capability of the master device, and transmit the resolution information to one or more of the plurality of image capture devices.

In addition, the master device may further include a lock module to detect a successful alignment condition with respect to one or more of the plurality of image capture devices, and transmit a lock message in response to the successful alignment condition.

Moreover, the master device may further include a collaborative image module to receive a captured image from each of the plurality of image capture devices to obtain a corresponding plurality of captured images, and generate a collaborative image based at least in part on the plurality of captured images, wherein the collaborative image is to include one or more of a panoramic image and a three dimensional (3D) image. The collaborative image module may also be configured to transmit the collaborative image to the plurality of image capture devices.

Additionally, the one or more adjustment recommendations of any of the aforementioned master device examples may include a graphical representation of one or more of an exposure setting operation, a zoom operation, a shift operation, a rotate operation and a twist operation.

Examples may also include a method of operating a slave device that involves transmitting sensor data to a master device, wherein the sensor data includes one or more of location data and orientation data. The method may provide for receiving one or more adjustment recommendations for a collaborative image capture event between a plurality of image capture devices including the slave device.

Additionally, the method of operating a slave device may further include outputting the one or more adjustment recommendations to one or more of an automated adjustment system and a preview display.

Additionally, the method of operating a slave device may further include capturing preview image data and transmitting the preview image data to the master device.

Moreover, the method of operating a slave device may further include receiving a sample request from the master device, conducting a zoom out operation in response to the sample request, capturing a sample collaborative image, and transmitting the sample collaborative image to the master device.

In addition, the method of operating a slave device may further include receiving resolution information from the master device, and applying the resolution information to a resolution setting of the slave device.

In addition, any one of the method examples of operating a slave device may further include receiving a lock message from the master device, wherein the lock message is associated with a successful alignment condition with respect to the plurality of image capture devices, and modifying a preview window of the slave device in response to the lock message.

Examples may also include at least one computer readable storage medium having a set of instructions which, when executed by a processor, cause a slave device to perform any of the aforementioned methods of operating a slave device.

Examples may also include a slave device having means for performing any of the aforementioned methods of operating a slave device.

Examples may also include a slave device having a fusion module to transmit sensor data to a master device, wherein the sensor data includes one or more of location data and orientation data. The slave device may also include an alignment module to receive one or more adjustment recommendations for a collaborative image capture event between a plurality of image capture devices including the slave device.

Additionally, the alignment module may output the one or more adjustment recommendations to one or more of an automated adjustment system and a preview display.

Additionally, the slave device may include a preview image module to capture preview image data and transmit the preview image data to the master device.

Moreover, the slave device may include a sample module to receive a sample request from the master device, conduct a zoom out operation in response to the sample request, capture a sample collaborative image and transmit the sample collaborative image to the master device.

In addition, the slave device may include a resolution module to receive resolution information from the master device and apply the resolution information to a resolution setting of the slave device.

In addition, the slave device may include a lock module to receive a lock message from the master device, wherein the lock message is to be associated with a successful alignment condition with respect to the plurality of image capture devices. The lock module may also be configured to modify a preview window of the slave device in response to the lock message.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method of operating a master device, comprising:
   receiving sensor data from a plurality of image capture devices, wherein the sensor data includes one or more of location data and orientation data;
   determining one or more rough adjustment recommendations for a collaborative image capture event based at least in part on the sensor data;
   transmitting the one or more rough adjustment recommendations to one or more of the plurality of image capture devices;
   receiving preview image data from the one or more plurality of image capture devices based at least in part on the one or more rough adjustment recommendations;
   conducting an image alignment analysis on the preview image data, wherein one or more fine adjustment recommendations are determined further based on the image alignment analysis;
   transmitting the one or more fine adjustment recommendations to one or more of the plurality of image capture devices;
   detecting a successful alignment condition with respect to at least one of the plurality of image capture devices based at least in part on the one or more fine adjustment recommendations; and
   transmitting a lock message in response to the successful alignment condition to notify the at least one of the plurality of image capture devices of present alignment.

2. The method of claim 1, further including:
   generating a collaborative preview based at least in part on the sensor data, the preview image data, the one or more rough adjustment recommendations, and the one or more fine adjustment recommendation; and
   outputting the collaborative preview via a local display of the master device.

3. The method of claim 1, further including obtaining a sample collaborative image that provides a sample of a scene corresponding to the collaborative capture event from one or more of an online source and one of the plurality of image capture devices, wherein the sample collaborative image is used to conduct the image alignment analysis on the preview image data.

4. The method of claim 1, further including:
   determining resolution information based at least in part on a preview capability of the master device; and
   transmitting the resolution information to one or more of the plurality of image capture devices to be utilized to obtain the preview image data.

5. The method of claim 1, further including:
   receiving a captured image from each of the plurality of image capture devices to obtain a corresponding plurality of captured images;
   generating a collaborative image based at least in part on the plurality of captured images, wherein the collaborative image includes one or more of a panoramic image and a three dimensional (3D) image; and
   transmitting the collaborative image to the plurality of image capture devices.

6. The method of claim 1, wherein one or more adjustment recommendations include a graphical representation of one or more of an exposure setting operation, a zoom operation, a shift operation, a rotate operation and a twist operation.

7. The method of claim 1, further including recommending orientating the one or more plurality of image capture devices in a general direction of a subject of the collaborative image capture event based on the one or more rough adjustment recommendations.

8. At least one non-transitory computer readable storage medium comprising a set of instructions which, when executed by a processor, cause a master device to:
receive sensor data from a plurality of image capture devices, wherein the sensor data is to include one or more of location data and orientation data;
determine one or more rough adjustment recommendations for a collaborative image capture event based at least in part on the sensor data;
transmit the one or more rough adjustment recommendations to one or more of the plurality of image capture devices;
receive preview image data from the one or more plurality of image capture devices based at least in part on the one or more rough adjustment recommendations;
conduct an image alignment analysis on the preview image data, wherein one or more fine adjustment recommendations are to be determined further based on the image alignment analysis;
transmit the one or more fine adjustment recommendations to one or more of the plurality of image capture devices;
detect a successful alignment condition with respect to at least one of the plurality of image capture devices based at least in part on the one or more fine adjustment recommendations; and
transmit a lock message in response to the successful alignment condition to notify the at least one of the plurality of image capture devices of present alignment.

9. The at least one medium of claim 8, wherein the instructions, when executed, cause the master device to:
generate a collaborative preview based at least in part on the sensor data, the preview image data, the one or more rough adjustment recommendations, and the one or more fine adjustment recommendation; and
output the collaborative preview via a local display of the master device.

10. The at least one medium of claim 8, wherein the instructions, when executed, cause the master device to obtain a sample collaborative image that is to provide a sample of a scene corresponding to the collaborative capture event from one or more of an online source and one or more of the plurality of image capture devices, wherein the sample collaborative image is to be used to conduct the image alignment analysis on the preview image data.

11. The at least one medium of claim 8, wherein the instructions, when executed, cause the master device to:
determine resolution information based at least in part on a preview capability of the master device; and
transmit the resolution information to one or more of the plurality of image capture devices to be utilized to obtain the preview image data.

12. The at least one medium of claim 8, wherein the instructions, when executed, cause the master device to:
receive a captured image from each of the plurality of image capture devices to obtain a corresponding plurality of captured images;
generate a collaborative image based at least in part on the plurality of captured images, wherein the collaborative image is to include one or more of a panoramic image and a three dimensional (3D) image; and
transmit the collaborative image to the plurality of image capture devices.

13. The at least one medium of claim 8, wherein one or more adjustment recommendations are to include a graphical representation of one or more of an exposure setting operation, a zoom operation, a shift operation, a rotate operation and a twist operation.

14. A method of operating a slave device, comprising:
transmitting sensor data to a master device, wherein the sensor data includes one or more of location data and orientation data;
receiving one or more rough adjustment recommendations from the master device determined by the master device based at least in part on the sensor data for a collaborative image capture event between a plurality of image capture devices including the slave device;
capturing preview image data based at least in part on the one or more rough adjustment recommendations;
transmitting the preview image data to the master device;
receiving one or more fine adjustment recommendations from the master device determined by the master device further based on an image alignment analysis on the preview image data; and
receiving a lock message generated by the master device in response to a detection by the master device of a successful alignment condition with respect to at least one of the plurality of image capture devices based at least in part on a fine adjustment recommendation, wherein the lock message is transmitted from the master device to notify at least the slave device of present alignment.

15. The method of claim 14, further including outputting one or more adjustment recommendations to one or more of an automated adjustment system and a preview display.

16. The method of claim 14, further including:
receiving a sample request from the master device;
conducting a zoom out operation in response to the sample request;
capturing a sample collaborative image that provides a sample of a scene corresponding to the collaborative capture event; and
transmitting the sample collaborative image to the master device to be utilized in the image alignment analysis on the preview image data.

17. The method of claim 14, further including:
receiving resolution information from the master device; and
applying the resolution information to a resolution setting of the slave device to obtain the preview image data.

18. The method of claim 14, further including
modifying a preview window of the slave device in response to the lock message.

19. The method of claim 14, further including allowing orientating of the slave device in a general direction of a subject of the collaborative image capture event based on the one or more rough adjustment recommendations.

20. At least one non-transitory computer readable storage medium comprising a set of instructions which, when executed by a processor, cause a slave device to:
transmit sensor data to a master device, wherein the sensor data includes one or more of location data and orientation data;
receive one or more rough adjustment recommendations from the master device to be determined by the master device based at least in part on the sensor data for a collaborative image capture event between a plurality of image capture devices including the slave device;
capture preview image data based at least in part on the one or more rough adjustment recommendations;
transmit the preview image data to the master device;
receive one or more fine adjustment recommendations from the master device to be determined by the master device further based on an image alignment analysis on the preview image data; and receive a lock message to be generated by the master device in response to a detection by the master device of a successful alignment condition with respect to at least one of the plurality of image capture devices based at least in part on a fine adjustment recommendation, wherein the lock message is to be transmitted from the master device to notify at least the slave device of present alignment.

21. The at least one medium of claim 20, wherein the instructions, when executed, cause the slave device to output one or more adjustment recommendations to one or more of an automated adjustment system and a preview display.

22. The at least one medium of claim 20, wherein the instructions, when executed, cause the slave device to:
receive a sample request from the master device;
conduct a zoom out operation in response to the sample request;
capture a sample collaborative image that is to provide a sample of a scene corresponding to the collaborative capture event; and
transmit the sample collaborative image to the master device to be utilized in the image alignment analysis on the preview image data.

23. The at least one medium of claim 20, wherein the instructions, when executed, cause the slave device to:
receive resolution information from the master device; and
apply the resolution information to a resolution setting of the slave device to obtain the preview image data.

24. The at least one medium of claim 20, wherein the instructions, when executed, cause the slave device to
modify a preview window of the slave device in response to the lock message.

25. A slave device comprising:
a fusion circuit to transmit sensor data to a master device, wherein the sensor data is to include one or more of location data and orientation data;
an alignment circuit to:
receive one or more rough adjustment recommendations from the master device to be determined by the master device based at least in part on the sensor data for a collaborative image capture event between a plurality of image capture devices including the slave device; and
receive one or more fine adjustment recommendations from the master device to be determined by the master device further based on an image alignment analysis on preview image data;
a preview image circuit to:
capture preview image data based at least in part on the one or more rough adjustment recommendations and transmit the preview image data to the master device; and
capture preview image data based at least in part on the one or more fine adjustment recommendations and transmit the preview image data to the master device; and
a lock circuit to receive a lock message to be generated by the master device in response to a detection by the master device of a successful alignment condition with respect to at least one of the plurality of image capture devices based at least in part on a fine adjustment recommendation, wherein the lock message is to be transmitted from the master device to notify at least the slave device of present alignment.

26. The slave device of claim 25, wherein the alignment circuit is to output one or more adjustment recommendations to one or more of an automated adjustment system and a preview display.

27. At least one non-transitory computer readable storage medium comprising a set of instructions which, when executed by a processor, cause a master device to:
receive sensor data from a plurality of image capture devices, wherein the sensor data is to include one or more of location data and orientation data;
determine one or more rough adjustment recommendations for a collaborative image capture event based at least in part on the sensor data;
transmit the one or more rough adjustment recommendations to one or more of the plurality of image capture devices;
receive preview image data from the one or more plurality of image capture devices based at least in part on the one or more rough adjustment recommendations;
obtain a sample collaborative image that is to provide a sample of a scene corresponding to the collaborative capture event from one or more of an online source and one or more of the plurality of image capture devices; and
conduct an image alignment analysis on the preview image data, wherein the sample collaborative image is to be used to conduct the image alignment analysis on the preview image data, and wherein one or more fine adjustment recommendations are to be determined further based on the image alignment analysis.

28. At least one non-transitory computer readable storage medium comprising a set of instructions which, when executed by a processor, cause a master device to:
receive sensor data from a plurality of image capture devices, wherein the sensor data is to include one or more of location data and orientation data;
determine one or more rough adjustment recommendations for a collaborative image capture event based at least in part on the sensor data;
transmit the one or more rough adjustment recommendations to one or more of the plurality of image capture devices;
determine resolution information based at least in part on a preview capability of the master device;
transmit the resolution information to one or more of the plurality of image capture devices to be utilized to obtain preview image data;
receive the preview image data from the one or more plurality of image capture devices based at least in part on the one or more rough adjustment recommendations; and
conduct an image alignment analysis on the preview image data, wherein one or more fine adjustment recommendations are to be determined further based on the image alignment analysis.

29. At least one non-transitory computer readable storage medium comprising a set of instructions which, when executed by a processor, cause a slave device to:
transmit sensor data to a master device, wherein the sensor data includes one or more of location data and orientation data;
receive one or more rough adjustment recommendations from the master device to be determined by the master device based at least in part on the sensor data for a collaborative image capture event between a plurality of image capture devices including the slave device;

capture preview image data based at least in part on the one or more rough adjustment recommendations;

transmit the preview image data to the master device;

transmit a sample collaborative image that is to provide a sample of a scene corresponding to the collaborative capture event; and receive one or more fine adjustment recommendations from the master device to be determined by the master device further based on an image alignment analysis on the preview image data, wherein the sample collaborative image is to be used by the master device to conduct the image alignment analysis on the preview image data.

30. At least one non-transitory computer readable storage medium comprising a set of instructions which, when executed by a processor, cause a slave device to:

transmit sensor data to a master device, wherein the sensor data includes one or more of location data and orientation data;

receive one or more rough adjustment recommendations for a collaborative image capture event between a plurality of image capture devices including the slave device;

capture preview image data based at least in part on the one or more rough adjustment recommendations;

receive resolution information from the master device;

apply the resolution information to a resolution setting of the slave device to obtain the preview image data;

transmit the preview image data to the master device; and receive one or more fine adjustment recommendations based on an image alignment analysis on the preview image data.

\* \* \* \* \*